US008532096B2

(12) United States Patent
Rao

(10) Patent No.: US 8,532,096 B2
(45) Date of Patent: Sep. 10, 2013

(54) LOCAL EXCHANGE ROUTING GUIDE INFORMATION MAINTENANCE SYSTEM AND METHOD

(75) Inventor: Pramod S. Rao, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 1729 days.

(21) Appl. No.: 11/346,487

(22) Filed: Feb. 1, 2006

(65) Prior Publication Data

US 2007/0189491 A1    Aug. 16, 2007

(51) Int. Cl.
*H04L 12/50* (2006.01)
*H04Q 11/00* (2006.01)
*H04M 3/42* (2006.01)
*H04M 7/00* (2006.01)
*H04M 1/00* (2006.01)
*H04M 9/00* (2006.01)

(52) U.S. Cl.
USPC . 370/389; 370/360; 379/220.01; 379/221.01; 379/221.14; 379/392

(58) Field of Classification Search
None
See application file for complete search history.

(56) References Cited

U.S. PATENT DOCUMENTS

| 6,614,781 | B1* | 9/2003 | Elliott et al. | 370/352 |
|---|---|---|---|---|
| 7,760,866 | B1* | 7/2010 | Dwekat et al. | 379/221.01 |
| 7,941,481 | B1* | 5/2011 | Partovi et al. | 709/203 |
| 2002/0101881 | A1* | 8/2002 | Sundaresan et al. | 370/468 |
| 2004/0199506 | A1* | 10/2004 | Shaffer et al. | 707/6 |
| 2005/0215250 | A1* | 9/2005 | Chava et al. | 455/433 |
| 2006/0008067 | A1* | 1/2006 | Shaffer et al. | 379/201.06 |

* cited by examiner

*Primary Examiner* — Hassan Phillips
*Assistant Examiner* — Lonnie Sweet
(74) *Attorney, Agent, or Firm* — Lempia Summerfield Katz LLC

(57) ABSTRACT

The present invention system and method facilitates efficient and accurate maintenance of LERG information. The present system and method periodic implementation of LERG downloads permits network devices to automatically update LERG information. A local exchange routing guide update method includes performing an automated LERG maintenance initialization process; engaging in an automated LERG parsing process; and executing an automated LERG synchronization process.

17 Claims, 4 Drawing Sheets

LOCAL EXCHANGE ROUTING GUIDE INFORMATION MAINTENANCE SYSTEM AND METHOD

FIELD OF THE INVENTION

This invention relates to the field of network communications. In particular, the present invention relates to a local exchange routing guide (LERG) information maintenance system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. Communication networks, such as telephone networks, are often utilized to realize many of these advantageous results. Telecommunication networks typically facilitate communication of information over large geographic areas between numerous devices. Managing communication activities and maintaining local exchange routing guide (LERG) information can be difficult and problematic.

Telecommunication networks offer a number of advantages including communicatively coupling numerous end users. Telecommunication networks typically have large infrastructures with a numerous end use and intermediate devices. The large number of end use devices, each with its own unique identifier, results in a large number of possible destinations for each communication. There is also a large number of intermediate devices that connect the end use devices.

Telephone networks typically operate by forwarding information from a source to an end use device. The information is routed via intermediate devices over a communication path included in the telecommunications network. The intermediate devices forward the communication information based upon routing information. Maintaining connection information for all the different device and possible paths in a communication network is complex and often problematic.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
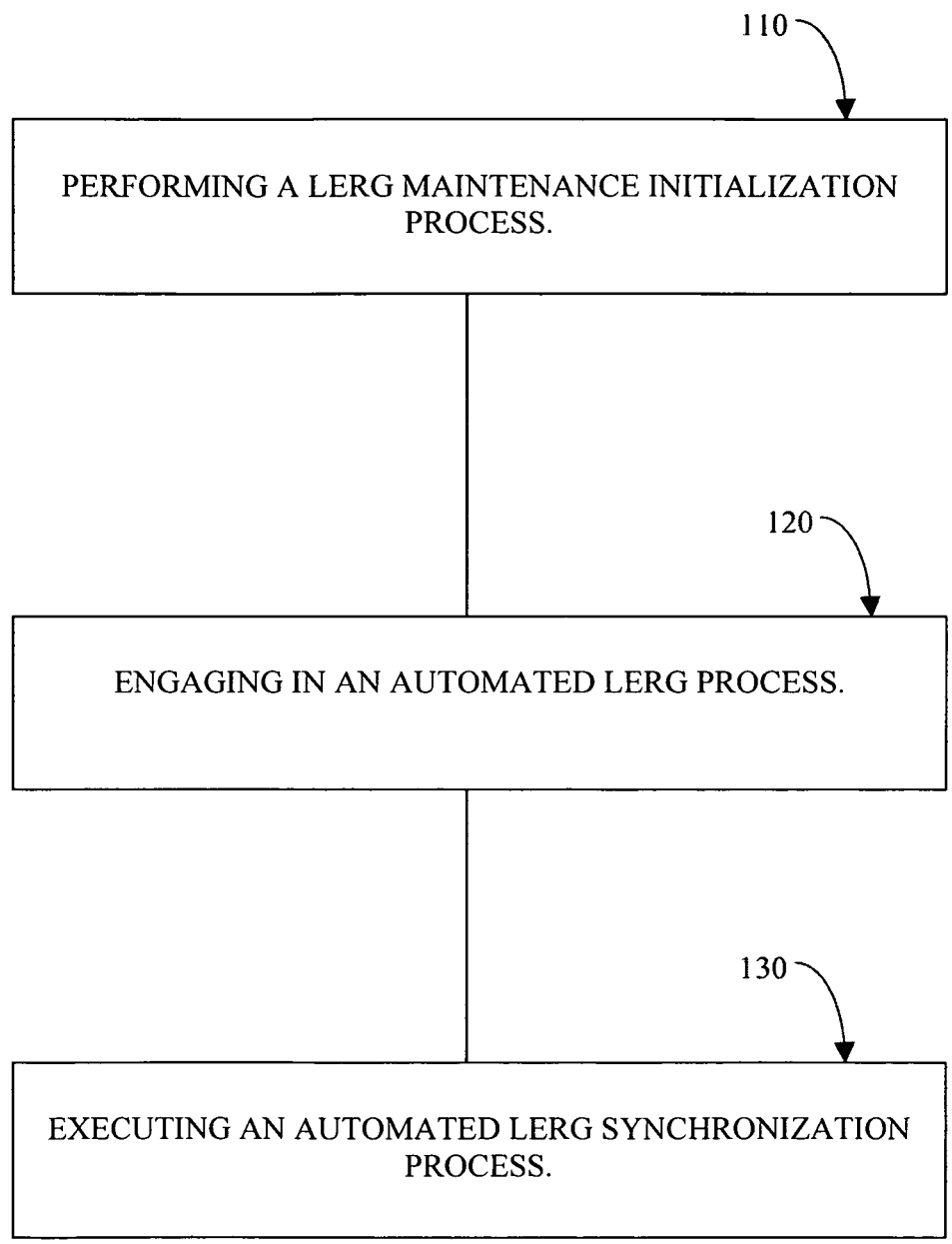
FIG. 1 is a flow chart of an exemplary local exchange routing guide (LERG) maintenance method in accordance with one embodiment of the present invention.
Figure 4:
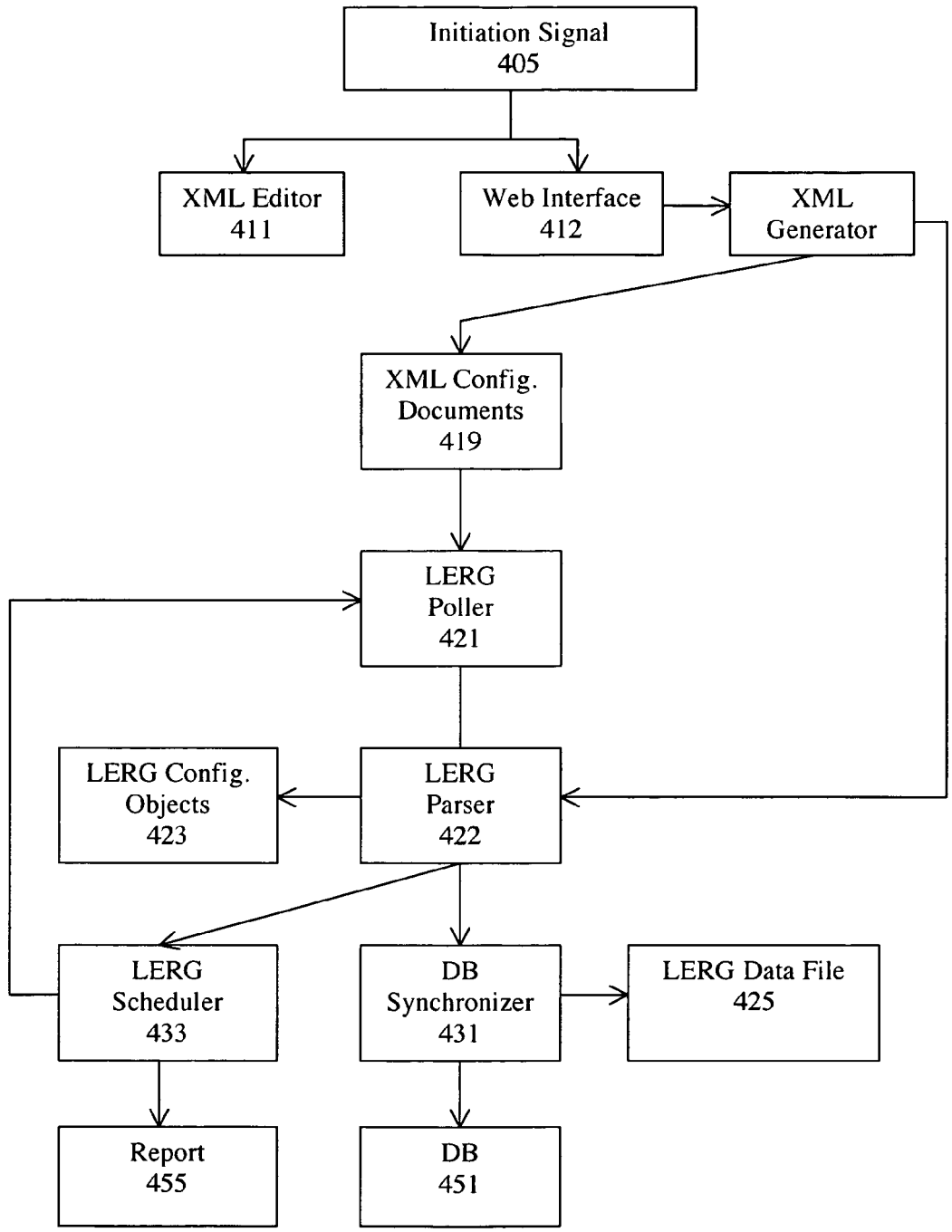
FIG. 4 is a block diagram of an exemplary local exchange routing guide (LERG) maintenance hierarchy in accordance with one embodiment of the present invention.

FIG. 1 is a flow chart of local exchange routing guide (LERG) maintenance method 100 in accordance with one embodiment of the present invention. Local exchange routing guide maintenance method 100 facilitates automated and efficient maintenance of LERG information in a communication network. Local exchange routing guide (LERG) maintenance method 100 is explained in conjunction with exemplary local exchange routing guide (LERG) maintenance hierarchy 400 shown in FIG. 4. Exemplary local exchange routing guide (LERG) maintenance hierarchy 400 is an example of a software module hierarchy for performing local exchange routing guide (LERG) maintenance method 100 in accordance with one embodiment of the present invention.

At block 110, a LERG maintenance initialization process is performed. In one embodiment, a LERG maintenance initialization process includes deploying LERG information for installation, establishing correlations between received LERG configured information and end user configured information, and establishing connection and scheduling information. For example, initiation signal 405 is received and a LERG maintenance initialization process is initiated. In one exemplary implementation, users can write XML configuration files containing mapping information, database configurations and scheduling information. For example a user can use XML editor 411 to write XML configuration files. Alternatively, a user can use a web interface (e.g., web interface 412) and an XML generator (e.g., XML generator 413) to generate the XML configuration files (e.g., XML configuration documents 419).

The XML configuration files are forwarded for parsing. There are a variety of ways in which a XML configuration file can be forwarded for parsing. In one exemplary implementation, an XML generation process passes the XML configuration files for parsing. Copies of the generated file under an install reports directory (e.g., report 455) are utilized for one time mapping. If a user specifies repetitive periodic schedules the file is stored in an install poll directory. In this situation, a LERG poling process (e.g., implemented by LERG poller 421) forwards the XML configuration file for parsing.

Block 120 of automated LERG information method 100 includes engaging in an automated LERG parsing process. The files are parsed (e.g., by LERG parser 422) and LERG mapping objects (e.g., LERG configuration objects 423) are constructed. This includes the creation of database connection object(s) and schedule object(s). In one embodiment, an object refers to an instance of a java class. The parsing process forwards the schedule object(s) for utilization in scheduling LERG maintenance updates (e.g., by LERG scheduler 433) and implementing a LERG DB synchronization (e.g., by DB synchronizer 431) at the specified schedule time. Database connection object(s) are forwarded for utilization in DB synchronization.

At block 130 an automated LERG synchronization process is executed. The LERG file is loaded from an installation directory. Then the data is parsed based on the mapping objects supplied by the LERG parsing process. A connection is established with an end-user database (e.g., data base 451) and an update process is performed (e.g., LERG data file 425 is downloaded).

In one embodiment of locale exchange routing guide maintenance method 100, a report indicating the result of the installation and update operations is prepared.

Figure 2:
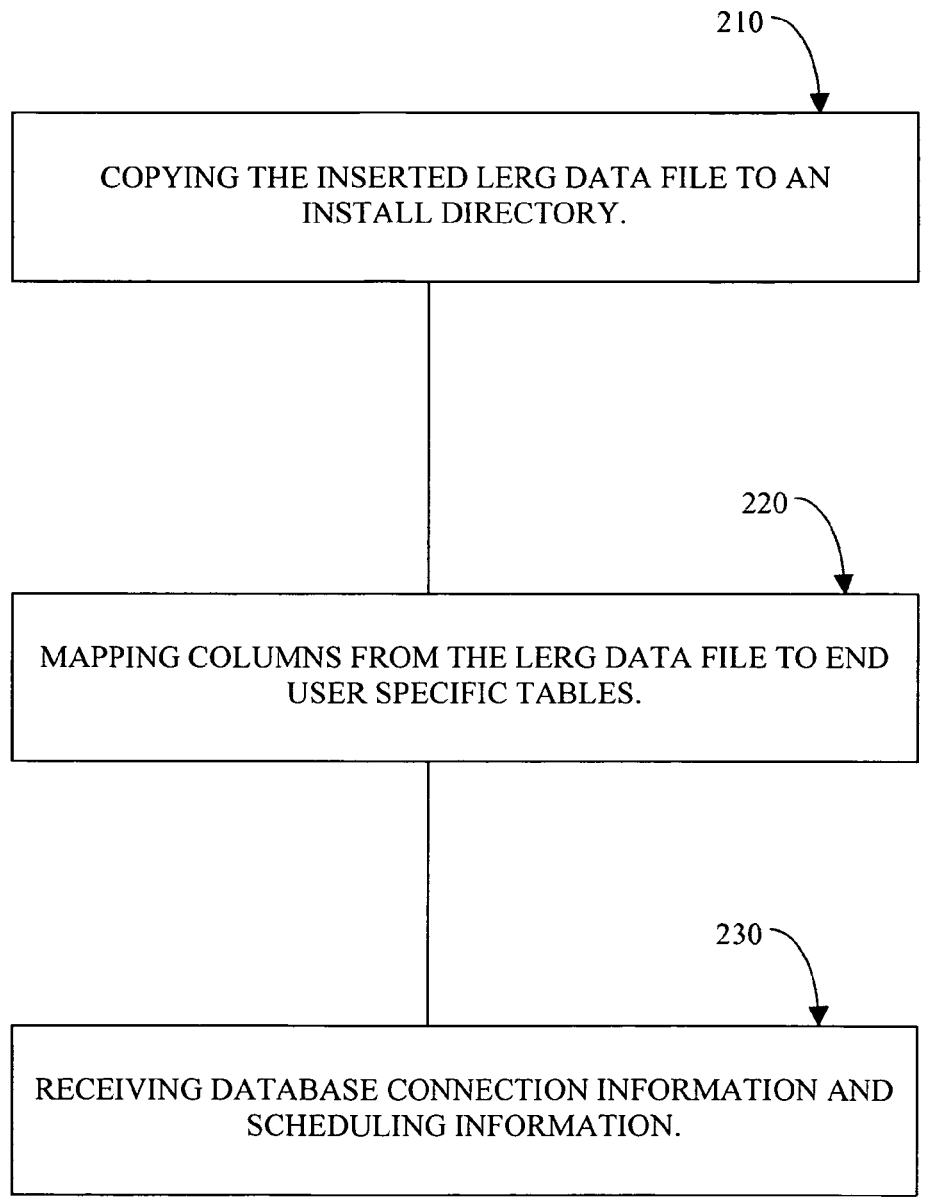
FIG. 2 is a flow chart of an exemplary LERG maintenance initialization process in accordance with one embodiment of the present invention.

FIG. 2 is a flow chart of LERG maintenance initialization process 200 in accordance with one embodiment of the present invention. In one exemplary implementation, LERG maintenance initialization process 200 is performed in step 110 of locale exchange routing guide maintenance method 100.

In step 210, the interested LERG data file (e.g. LERG.DAT file) is copied into an install directory. In one exemplary implementation the LERD data file is copied into the directory automatically. The LERG data file can also be copied manually or using the web interface.

In step 220, LERG columns from the LERG data file are mapped to end-user specific tables and columns. In one exemplary implementation a user maps an LERG6INS.DAT file column to the LERG table column.

In step 230, a user enters database (DB) connection information and scheduling information. The scheduling information includes an indication of when synchronization is performed. In one exemplary implementation the scheduling can be done once in a week or once in a month or once a day. It is also possible to implement a single LERG information download by just scheduling a one time download.

Figure 3:
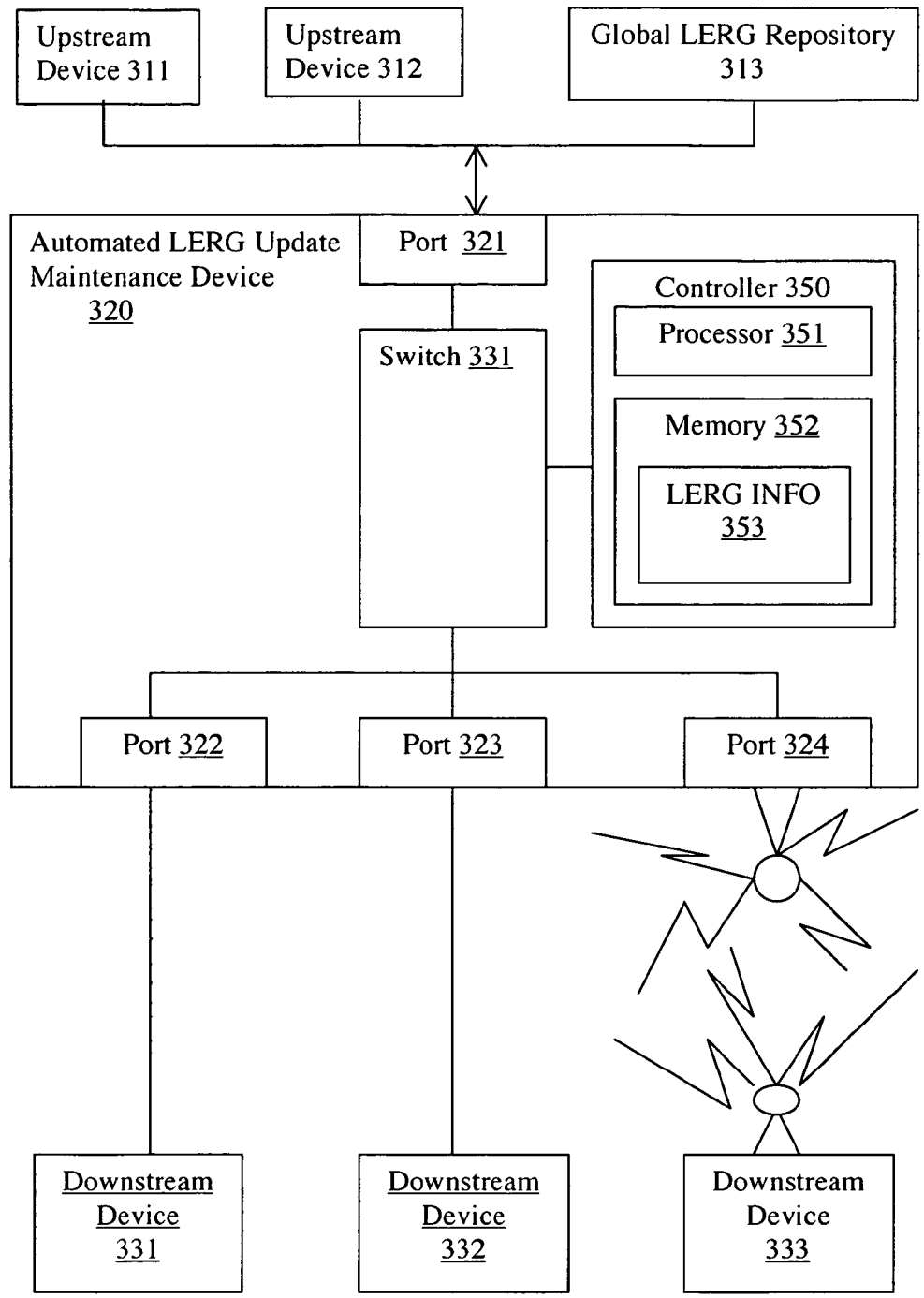
FIG. 3 is a block diagram of an exemplary communication system, in accordance with one embodiment of the present invention.

FIG. 3 is a block diagram of communication system 300 including an automated LERG update maintenance device 320 in accordance with one embodiment of the present invention. Communication system 300 includes upstream devices 311, 312, global LERG repository 313, automated LERG update maintenance device 320, and downstream 331, 332 and 333. Upstream devices 311, 312 and global LERG repository 313 are communicatively coupled to automated LERG update maintenance device 320, which in turn is communicatively coupled to downstream device 331, 332 and 333.

The components of communication system 300 cooperatively operate to provide information communication in accordance with automatically updated LERG information. Upstream devices 311 and 312 forward information to automated LERG update maintenance device 320 from one or more sources (not shown). For example, a first source data (e.g. data related to web site) can come from a first content supplier and second source data (e.g., e-mail) can be from a second different content supplier. In one embodiment, the first content supplier can forward source data from different source addresses. In one embodiment, automated LERG update maintenance device 320 selectively forwards the information to the downstream device based upon group LERG routing information (e.g., IP group destination address) and source information (e.g., IP group source address) in the source data. Downstream devices 331, 332 and 333 can be other intermediate network devices that forward the information to other device further down the network hierarchy or they can be end use devices that present the information to a user. Global LERG repository 313 acts as a global LERG repository or database for storing LERG information for the devices included in network 300. In one exemplary implementation, automated LERG update maintenance device 320 automatically retrieves LERG information from global LERG repository 313.

In one embodiment, LERG update maintenance device 320 automatically retrieves the updated LERG information from global LERG repository 313 by performing a local exchange routing guide (LERG) maintenance method. For example, LERG update maintenance device 320 can automatically update LERG information by parsing LERG data files retrieved from global LERG repository 313. LERG update maintenance device 320 utilizes the parsed information to populate internal LERG files. It is appreciated that LERG update maintenance device can be implemented with a variety of LERG information storage configurations and/or databases. It is also appreciated that LERG information retrieval operations of LERG update maintenance device 320 can be scheduled for automatic implementation to coincide with a variety of scheduling and/or synchronization objectives. In one exemplary implementation, LERG update maintenance device 120 local exchange routing guide (LERG) maintenance method 100.

Automated LERG update maintenance device 320 includes input port 321, switch 331, controller component 350, and output ports 322, 323, and 324. Input port 321 is coupled to switch 331, which in turn is coupled to output ports 322, 323, and 324. Switch 331 is also coupled to controller 350. Input port 321 receives communication packets. Switch 331 selectively forwards the communication packets to the output ports. Output ports 322, 323 and 324 forward the communication packet to downstream devices 331, 332 and 333 respectively. Controller component 350 controls selection of information (e.g., the communication packets) switched to each of the output ports based upon source and destination indications within the communication packets and updated LERG information.

In one embodiment of the present invention, controller component 350 includes processor 351 and memory 352. Processor 351 is coupled to memory 352. Processor 351 selectively identifies which of the plurality of output ports a communication packet is to be communicated on. Memory 352 stores instructions for the processor including updated LERG information. In one exemplary implementation, memory 352 includes updated LERG information 353 for mapping ports to destination indications. Controller component 350 selects which output ports (e.g., 322, 323 and/or 324) to forward information on in accordance with updated LERG information 353 mapping of the output ports to combinations of destination indications. Controller component 350 opens up a received packet and analyzes source and group destination indications included in the packet. Based on the analysis, controller component 350 forwards packets to output ports mapped to the corresponding destination and source indication. In one embodiment, packets are forwarded to an output port unless controller component 350 prevents or blocks a packet from being forwarded to the output port (e.g., the port is not mapped to a corresponding destination).

Thus, the present invention is a system and method that facilitates efficient and accurate maintenance of LERG information. The present invention's periodic implementation of LERG downloads permits network devices to automatically update LERG information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
receiving data from a first content supplier and a second content supplier, wherein the data is an update for a local exchange routing guide (LERG) file;
providing a user interface for editing an extensible markup language (XML) configuration file;
parsing, with a networking device, the XML configuration file to identify scheduling information and mapping information included in the XML configuration file,
wherein the mapping information is configured to define a mapping between the LERG file and a local database,
generating a copy of the XML configuration file;
polling the copy of the XML configuration file according to the scheduling information;
wherein the scheduling information is configured to identify a time for the networking device to populate the local database with information from the update for the LERG file, and
in response to the time identified in the scheduling information in the XML configuration file, populating, with the networking device, the local database with information from the update for the LERG file based on the mapping information.

2. The method of claim 1, wherein the XML configuration file includes connection information corresponding to the local database, and wherein the populating of the local database with information from the update for the LERG file further comprises connecting with the local database according to the connection information from the XML configuration file.

3. The method of claim 1, wherein the scheduling information is configured to identify multiple periodic synchronization times for the local database to be updated with LERG information.

4. The method of claim 1, wherein the mapping information is configured to identify one or more columns in the local database to populate with corresponding columns from the LERG file.

5. The method of claim 1, further comprising
receiving the XML configuration file from a user interface device; and
receiving the update for the LERG file from a remote device.

6. A device comprising:
a database device to store routing information and a configuration file;
a controller configured to identify scheduling information included in the configuration file, wherein the controller is configured to store a copy of the configuration file at an install directory according to the scheduling information;
a polling device configured to periodically poll the install directory for the copy of the configuration file;
wherein the controller is configured to route network traffic based on the routing information stored in the database device,
wherein the controller is configured to parse the copy of the configuration file to identify mapping information included in the configuration file, wherein the mapping information is configured to define a mapping between a local exchange routing guide (LERG) file and the database device,
wherein the scheduling information is configured to identify a time for the networking device to populate the local database with information from the LERG file,
wherein the configuration file is separate from the LERG file, and
wherein, in response to the time identified in the scheduling information in the configuration file, the controller is configured to populate the database device with the routing information based on the LERG file and the mapping information.

7. The device of claim 6, wherein the configuration file includes connection information corresponding to the database device, and wherein the populating of the database device further comprises connecting with the database device according to the connection information from the configuration file.

8. The device of claim 6, wherein the scheduling information is configured to identify a one-time synchronization of the LERG file and the database device or multiple periodic synchronization times for the database device to be updated with LERG information.

9. The device of claim 6, further comprising an input port to receive an updated LERG file, and wherein the controller is configured to populate the database device with information from the updated LERG file based on the mapping information in the configuration file and in response to the scheduling information in the configuration file.

10. The device of claim 6, wherein the mapping information is configured to identify one or more columns in the database device to populate with corresponding columns from the LERG file.

11. The device of claim 6, wherein the configuration file is in an Extensible Markup Language (XML).

12. An apparatus including a computer-readable memory device storing instructions configured to cause a controller to perform operations comprising:
  receiving data from a first content supplier and a second content supplier, wherein the data is an update for a local exchange routing guide (LERG) file;
  providing a user interface for editing an extensible markup language (XML) configuration file;
  parsing the XML configuration file to identify scheduling information and mapping information included in the XML configuration file,
  generating a copy of the XML configuration file;
  polling the copy of the XML configuration file according to the scheduling information;
  wherein the mapping information is configured to define a mapping between the LERG file and a local database,
  wherein the scheduling information is configured to identify a time for the networking device to populate the local database with information from the update for the LERG file, and
  wherein the XML configuration file is separate from the update for the LERG file; and
  populating the local database with information from the update for the LERG file based on the mapping information and in response to the scheduling information in the XML configuration file.

13. The apparatus of claim 12, wherein the XML configuration file includes connection information corresponding to the local database, and wherein the populating of the local database with information from the update for the LERG file further comprises connecting with the local database according to the connection information from the XML configuration file.

14. The apparatus of claim 12, wherein the scheduling information is configured to initiate a one-time synchronization of the update for the LERG file and the local database based on the mapping information.

15. The apparatus of claim 12, wherein the scheduling information is configured to identify multiple periodic synchronization times for the local database to be updated with LERG information.

16. The apparatus of claim 12, wherein the mapping information is configured to identify one or more columns in the local database to populate with corresponding columns from the LERG file.

17. The apparatus of claim 12, wherein the instructions are further configured to cause the controller to perform operations comprising:
  receiving the XML configuration file from a user interface device.

* * * * *